F. R. ABEEL.
MECHANICAL SCRAPER.
APPLICATION FILED JUNE 18, 1908.
921,331.
Patented May 11, 1909.
3 SHEETS—SHEET 1.
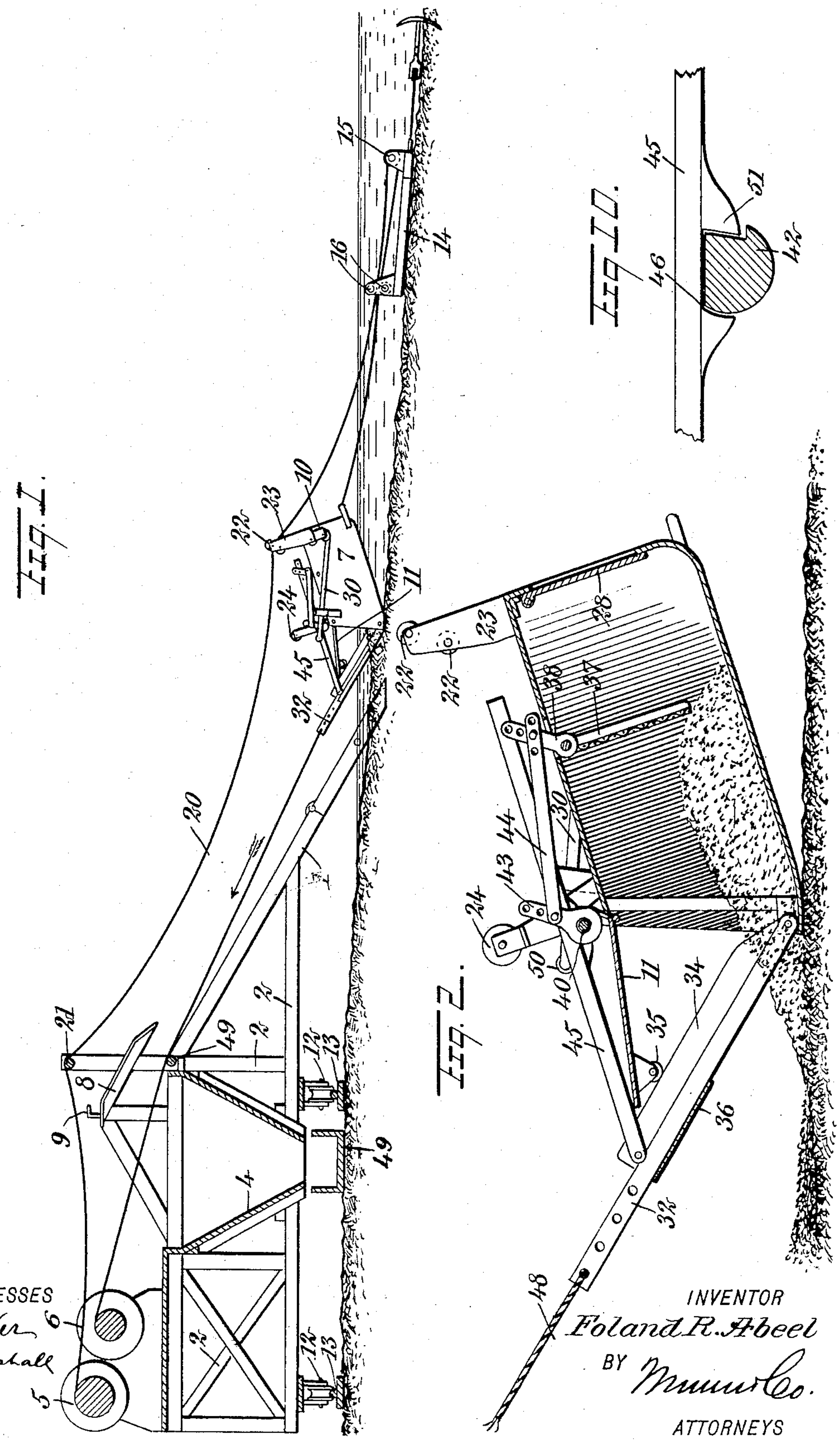
WITNESSES
H. Walker
E. B. Marshall
INVENTOR
Foland R. Abeel
BY Munn & Co.
ATTORNEYS F. R. ABEEL.
MECHANICAL SCRAPER.
APPLICATION FILED JUNE 18, 1908.
921,331.
Patented May 11, 1909.
3 SHEETS—SHEET 2.
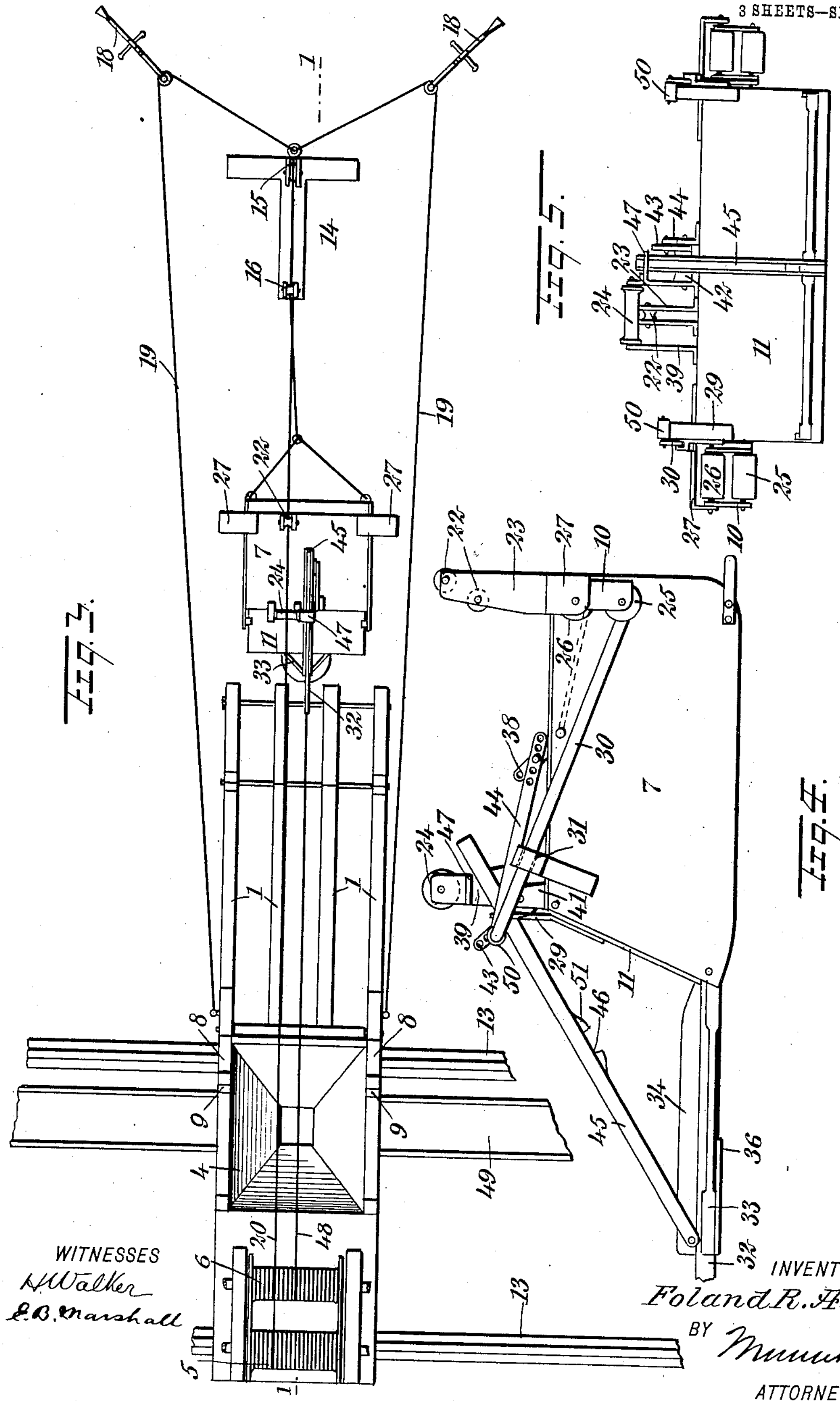
WITNESSES
H. Walker
E. B. Marshall
INVENTOR
Foland R. Abeel
BY Munn & Co.
ATTORNEYS F. R. ABEEL.
MECHANICAL SCRAPER.
APPLICATION FILED JUNE 18, 1908.
921,331. Patented May 11, 1909.
3 SHEETS—SHEET 3.
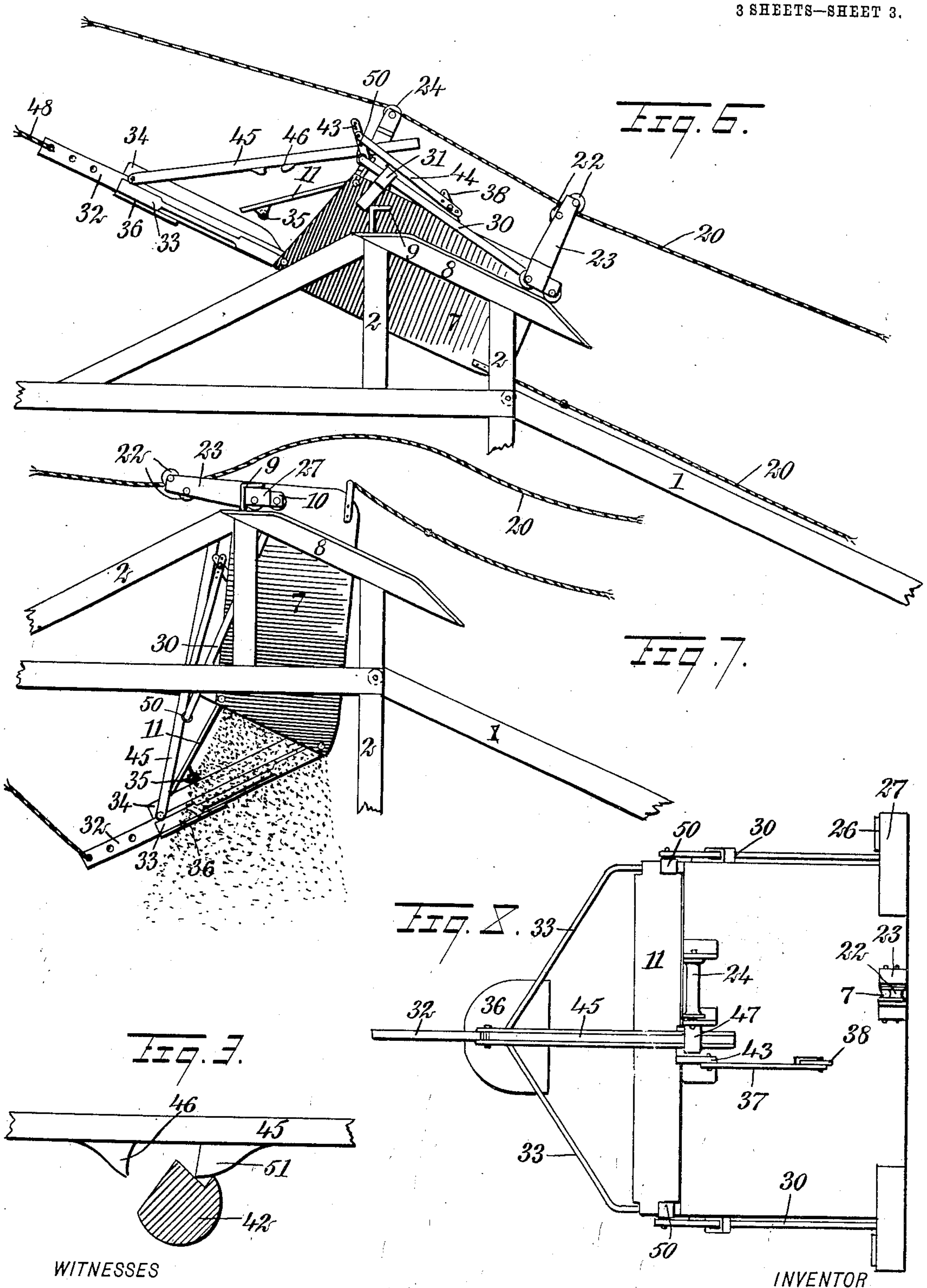
WITNESSES
H. Walker
E. B. Marshall
INVENTOR
Foland R. Abeel
BY Munn & Co.
ATTORNEYS

UNITED STATES PATENT OFFICE.

FOLAND ROMEYN ABEEL, OF TACOMA, WASHINGTON.

MECHANICAL SCRAPER.

No. 921,331. Specification of Letters Patent. Patented May 11, 1909.

Application filed June 18, 1908. Serial No. 439,114.

*To all whom it may concern:*

Be it known that I, FOLAND ROMEYN ABEEL, a citizen of the United States, and a resident of Tacoma, in the county of Pierce and State of Washington, have invented a new and Improved Mechanical Scraper, of which the following is a full, clear, and exact description.

My invention relates to improvements in mechanical scrapers, and it is provided with a shovel which is supported by a cable, which also serves to draw the shovel in one direction, the cable passing through a pulley secured by anchors, or otherwise, in a predetermined position; an inclined plane with a hopper having its mouth at the top thereof, there being trips secured to the said inclined plane which are adapted to open the shovel when it is so disposed as to dump its contents into the said hopper. The said shovel has a pivoted rear gate which is adapted to open inwardly when the shovel is drawn backwardly, and is adapted to close against the stops at the end of the shovel, the front gate of the shovel being also pivoted and being controlled as follows: The shovel has wings pivoted at its sides in which are rotatably mounted wheels which are adapted to co-act with the trips, thereby actuating the wings to which rods are pivoted, the rods having wheels at their front terminals, and adapted to engage upwardly projecting members secured to the front gate so that when the wings come in contact with the said trips the front gate of the shovel is open. As the shovel passes over the hopper, it tends to fall therein, but is held at its rear end by a check with which the wings contact. When the forward end of the shovel hangs downwardly into the hopper, the draft bar moves upwardly relatively to the shovel, and the buffer wheel on the inside of the front gate comes in contact with the draft bar which holds the front gate of the shovel in an open position, inasmuch as the hook in the hook bar engages the cam on the top of the shovel. When the shovel has been drawn away from the inclined plane and is again drawn toward the inclined plane, the material entering the shovel causes the screen pivoted therein to move backwardly, which by means of the lever arms and the link rotate the cam to free the hook bar, so that as the shovel is continued to be drawn toward the inclined plane, the front gate of the shovel closes. A guide member is secured to the draft bar, and by varying the position of the said guide member relatively to the draft bar, the depth of the cut made by the cutting edge of the shovel may be determined.

In this specification I will describe the preferred form of my invention, but I do not limit myself thereto, as it will be understood that I consider myself entitled to all forms and embodiments of the invention which may be held to fall within the scope of the appended claims.

Reference is to be had to the accompanying drawings forming a part of this specification, in which similar characters of reference indicate corresponding parts in all the figures, in which—

Figure 1 is a sectional view on the line 1—1 of Fig. 3; Fig. 2 is an enlarged sectional view of the shovel showing the material entering it, and the screen, the levers and the link, by the operation of which the front gate may be permitted to close; Fig. 3 is a plan view of the parts arranged as shown in Fig. 1; Fig. 4 is a side elevation of the shovel with the front gate closed; Fig. 5 is a front view of the shovel, on a smaller scale than the views shown in Figs. 2 and 4; Fig. 6 is a fragmentary view of the inclined plane, showing the shovel supported on a cable, and the trip and the check for supporting the shovel; Fig. 7 is a similar view to that shown in Fig. 6 but with the shovel held by the check with its forward end extending into the hopper and the material falling from the shovel; Fig. 8 is a plan view of the parts arranged as shown in Fig. 5; Fig. 9 is a view of the cam and the hook bar, the cam being shown in a position which it assumes when it is being turned to free the hook bar; and Fig. 10 is a similar view of the cam and the hook bar, the hook on the hook bar engaging the cam to hold the draft bar in an upwardly disposed position and the front gate of the shovel open.

By referring to the drawings, it will be seen that I provide an inclined plane 1, which is supported by a frame 2, in which at the rear thereof is disposed a hopper 4; the mouth thereof being in alinement with the top of the inclined plane 1. At the rear of the frame 2 are disposed drums 5 and 6 on which the cables may be wound, which operate the shovel 7. There are also secured to the frame 2, trips 8 and checks 9, the trips being adapted to engage wings 10, and by the mechanism which will hereafter be described, which is secured thereto, to open the front gate 11 of the said shovel 7. The frame 2 may be supported on wheels or casters 12, which are adapted to travel on tracks 13, so that the inclined plane, with the hopper, the drums and so forth, may be moved to the desired position from which the shovel is to be operated.

As shown in Fig. 1 of the drawings, the scraper is adapted to be used in river beds, and a plate 14 having pulleys 15 and 16 mounted thereon, may be anchored at the bottom of the stream by means of anchors 18, there being blocks secured to the anchors, so that the cables 19 which are secured to the said plate 14 will pass through the blocks secured to the anchors 18 respectively, and will then extend to the frame so that the position of the plate 14 may be changed as may be deemed to be advisable. A cable 20, which is supported on the frame 2 by means of a pulley 21, is wound on the drum 5 and extends over the said pulley 21, between the pulleys 22 in the standard 23, and then passes between the pulley 16 in the plate 14 around the pulley 15 in the said plate, back between the said pulleys 16 and thence to the shovel, to which it is secured. To the front of the shovel, there is attached an elongated pulley 24 with which the cable 20 may engage when the shovel is being hauled upwardly on the inclined plane 1.

The wings 10, hereinbefore mentioned, are pivoted to the sides of the shovel 7 and in the said wings respectively, are rotatably mounted wheels 25, and wheels 26 are mounted on frames 27 secured to the shovel 7 and to which the wings 10 are pivoted.

A rear gate 28 is pivoted to the shovel at its upper terminal, and is adapted to swing inwardly, but which when it swings comes in contact with the rear of the shovel 7, so that it is not adapted to swing outwardly, relatively to the shovel. The front gate 11 is also pivoted at the top of the shovel, and is adapted to contact with the frame of the shovel to close the forward end thereof. The front and the sides of the shovel form acute angles with the base thereof, and the front gate 11 forms an obtuse angle with the top of the shovel when the gate is closed.

An upwardly projecting member 29 is secured to the front gate 11 of the shovel, and one end of a rod 30 has a wheel 50 which is adapted to engage this member 29, the other terminal of the rod 30 being pivoted to the wing 10, there being rods 30 at either side of the shovel, both rods being mounted as stated. Guides 31 are secured to the sides of the shovel respectively, the said rods 30 passing loosely through the said guides 31, the guides being provided to retain the rods 30 in place under all circumstances.

To the bottom of the front of the shovel 7 is pivoted a central draft bar 32 which has side members 33 secured thereto, the said side members being pivoted to the bottom of the shovel, and the central draft bar 32 also has a central buffer member 34 secured thereto, the said buffer member 34 being adapted to engage the wheel 35, which is mounted on the lower inside of the front gate 11 of the shovel 7. There is also a guide member 36 secured to the lower side of the central draft member 32, the said guide member being adapted to regulate the depth of the cut of the cutting edge of the shovel.

To the top of the shovel 7 is pivoted a screen 37, the screen being suspended in the shovel and to the said screen 37 is secured a lever 38, the said lever extending upwardly through the top of the shovel so that it will project therefrom.

In the standard 39 which supports the pulley 24 there is journaled a stud 40, the other end of the stud being journaled in a second standard 41. This stud is fashioned to form a cam 42, and to the stud is secured a lever 43 which projects upwardly. The levers 38 and 43 are connected by a link 44, there being a plurality of orifices in the levers 43 and 38 and in the terminal of the link 44, so that the desired connection between the levers 38 and 43 may be obtained.

To the central buffer member 34 is pivoted a hook bar 45 having hooks 46 and 51 on its lower face. The hook bar extends over the cam 42 and beneath a guide 47, which is secured to the standard 39, and when the draft member 32 is extended upwardly relatively to the shovel 7, the hook 46 will engage the cam 42 and will be held thereby, provided the cam is in the position shown in Fig. 10 of the drawings. The position shown in Fig. 10 of the drawings, is that which the cam will assume when the screen 37 has not been thrown backwardly as will occur when the material entering the shovel contacts therewith. When the material entering the shovel contacts with the screen 37 and forces it rearwardly the cam 42 will assume the position shown in Fig. 9 which will release the hook bar 45. A cable 48 is secured to the draft bar 32, said cable 48 extending over the pulley 49 mounted at the top of the inclined plane 1, the cable then being wound on the drum 6.

In using my invention the frame 2 is moved on the tracks 13 to the desired position, and the lower end of the incline is lowered to the ground. The plate 14 with the cable mounted in the pulleys thereon, is then lowered to the bed of the stream and the anchors 18 are placed in proper positions, the cables 19 which are secured to the plate 14 passing through the blocks in the said anchors 18 respectively, and any further adjustment of the plate 14 may be made by means of the said cables 19, the inner terminals of which are secured to the frame of the device. The cable 20 which passes bethe said means, the link being adapted to operate the last named means.

9. A mechanical shovel, a gate pivoted thereto, a hook bar which is adapted to coact with the gate, a cam mounted to rock on the shovel, the hook on the hook bar being adapted to engage the cam, a member pivoted within the shovel, and means connected with the said member which are adapted to rock the shaft.

10. A mechanical shovel, a gate pivoted thereto, a hook bar which is adapted to coact with the gate, a cam mounted to rock on the shovel, the hook on the hook bar being adapted to engage the cam, a member pivoted within the shovel, levers secured to the cam and to the said member respectively, and a link connecting the said levers.

11. A mechanical shovel, a gate pivoted thereto, a hook bar which is adapted to coact with the gate, a cam mounted to rock on the shovel, the cam having a considerable surface of its periphery curved and with two flat surfaces one of which does not extend to the curved periphery, thus forming a shoulder, the hook on the hook bar being adapted to engage the cam, a member pivoted within the shovel, and means connected with the member which are adapted to rock the cam.

12. A mechanical shovel, a gate pivoted thereto, a hook bar which is adapted to coact with the gate, a cam which is adapted to rock on the shovel, the cam having a considerable portion of its periphery curved and which has two flat surfaces one of which does not extend to the curved periphery, thus forming a shoulder, the hook on the hook bar being adapted to engage the cam, a member pivoted within the shovel, arms secured to the said member and to the cam respectively, and a link connecting the said arms.

13. A mechanical shovel, a gate pivoted thereto, a hook bar which is adapted to coact with the gate, a guard for the hook bar, a cam mounted to rock on the shovel, the hook bar being adapted to engage the cam, a member pivoted within the shovel, and means connected with the member which are adapted to rock the cam.

14. A mechanical shovel, a gate pivoted thereto, a hook bar which is adapted to coact with the gate, a guard for the hook bar, a cam mounted to rock on the shovel, the hook on the hook bar being adapted to engage the cam, a member pivoted within the shovel, arms secured to the said member and to the cam respectively, and a link connecting the said arms.

15. A mechanical shovel, a gate and a draft member pivoted thereto, the draft member being adapted to engage the gate when it is open and to so hold it, means within the shovel which are adapted to be operated by the movement of the material entering it, and means connected with the said means which are adapted to secure the draft member.

16. A mechanical shovel, a gate and a draft member pivoted thereto, the draft member being adapted to engage the gate when it is open and to so hold it, means which are adapted to lock the draft member, and means pivoted within the shovel which are adapted to operate the said means.

17. A mechanical shovel, a gate and a draft member pivoted thereto, the draft member being adapted to engage the gate when it is open and to so hold it, means within the shovel which are adapted to be operated by the movement of the material entering it, a cam mounted to rock on the shovel, a hook bar which is pivoted to the draft bar, the hook on the hook bar being adapted to engage the cam, and means connected with the said means which are adapted to rock the cam.

18. A mechanical shovel, a gate and a draft member pivoted thereto, the draft member being adapted to engage the gate when it is open and to so hold it, pivoted means disposed within the shovel, a cam adapted to rock on the shovel, a hook bar pivoted to the draft member, the hook on the hook bar being adapted to engage the cam, and means connected with the pivoted means within the shovel which are adapted to rock the cam.

19. A mechanical shovel, a gate and a draft member pivoted thereto, the draft member being adapted to engage the gate when it is open and to so hold it, pivoted means disposed within the shovel, a cam mounted to rock on the shovel, the said cam having a considerable portion of its periphery curved and which has two flat surfaces one of which does not extend to the curved periphery, thus forming a shoulder, a hook bar pivoted to the draft member, the hook on the hook bar being adapted to engage the cam, and means connected with the said pivoted means which are adapted to rock the cam.

20. A mechanical shovel, a gate and a draft member pivoted thereto, a wheel adapted to rotate on the inside of the gate, the draft member being adapted to engage the gate when it is open and to so hold it, means within the shovel which are adapted to be operated by the movement of the material, and means connected with the said means which are adapted to secure the draft bar.

21. A mechanical shovel, a gate and a draft member pivoted thereto, the draft member being adapted to engage the gate when it is open and to so hold it, a guide member secured to the draft member, means within the shovel which are adapted to be operated by the movement of the material, and means connected with the said means tween the pulleys 22 on the standard 23 of the shovel has its outer terminal secured to the base of the shovel, and the cable 48 has its outer terminal secured to the central draft member 32. The shovel 7 is then drawn downwardly toward the plate 14, by means of the drum 5, the drum 6 being free to permit the cable 48 to run out as the shovel 7 moves toward the said plate. As the shovel moves out, the hook 51 on the hook bar 45 engages the cam 42, the cam assuming the position shown in Fig. 10 of the drawings, so that with the front gate 11 of the shovel 7 open, the wheel 35 mounted on the inside of the said gate engages the central buffer member 34, so that the gate is held open with the draft member 32 disposed upwardly with reference to the shovel. The hook 46 is for the purpose of coming in contact with the cam 42, thus preventing the door 11 of the shovel from straining at the time of raising the bar 32. As the shovel is drawn through the water, the rear gate 28 swings inwardly so that there will be as little hindrance to the passage of the shovel as possible. When the shovel is well out in the stream, over the gravel or other material which the operator wishes to obtain, the cable 48 is wound on the drum 6 and the cable 20 is unwound from the drum 5 as may be necessary to enable the shovel 7 to travel up the inclined plane 1, but to obtain the best results, the cable 20 will be taut at all times to permit it to support the rear of the shovel, and if desired, a suitable brake may be applied to the drum 5 to obtain this result. As the shovel 7 is drawn toward the incline, the material entering the shovel will force the screen 37 rearwardly which will move the lever 38 forwardly, and by means of the link 44, the lever 43 will also be moved forwardly. As the lever 43 is moved forwardly, the cam 42 will assume the position shown in Fig. 9 of the drawings, and as the cam continues to move, the hook 51 on the hook bar 45 will be freed to permit the bottom of the shovel 7 to fall so that it will rest on the bottom of the stream, and as the cable is hauled, the forward end of the shovel will be disposed upwardly, which will permit the front gate 11 of the shovel 7 to close. When the shovel reaches the incline, it will be hauled upwardly, toward the mouth of the hopper 4 and when it is at the top of the incline, the wings 10 will encounter the trips 8, which will force the wings rearwardly and by means of the rods 30, will open the front gate 11, and as the shovel 7 is hauled over the hopper 4, the wings 10 will encounter the checks 9, which will support the shovel when the front gate thereof is open over the hopper with the forward end of the shovel disposed outwardly, which will permit the gravel or other material to fall into the hopper, on to the trough 49. As the gravel or other material falls from the hopper, it will cause the screen 37 to move forwardly, which, as has been described, will operate the cam 42 so that it will assume the position shown in Fig. 10 of the drawings, and as the front gate of the shovel 7 is open, with the buffer member 34 pressing against the wheel 35, and as the hook 51 of the hook bar 45 which is pivoted to the buffer member 34, engages the cam 42, while the cam 42 is in the position shown in Fig. 10, the draft member will be held upwardly relatively to the shovel 7, with the buffer member 34 pressing against the wheel 35 on the inner face of the front gate 11, and these parts will be held in this position by means of the engagement of the hook 51 with the cam 42. The shovel 7 is again drawn toward the plate 14 and the operation is repeated. The guide member 36 on the bottom of the draft bar 32 is adapted to regulate the depth of the cut of the cutting edge of the shovel, by its adjustment to and from the shovel.

Having thus described my invention, I claim as new and desire to secure by Letters Patent:

1. A mechanical shovel, pivoted front and rear gates for the shovel, and means to open and close one of the said gates.

2. A mechanical shovel, a gate pivoted thereto, means which may be operated at a distance which are adapted to close the said gate, and a trip which is adapted to open the gate.

3. A mechanical shovel, a gate pivoted to the shovel, a wing which is also pivoted to the shovel, a trip disposed in the path of the wing, and means connected to the gate and to the wing by which the latter is adapted to operate the former.

4. A mechanical shovel, a gate pivoted to the shovel, a wing which is also pivoted to the shovel, a trip disposed in the path of the wing, and a rod connecting the wing to the gate.

5. A mechanical shovel, a gate and a wing pivoted thereto, a trip disposed in the path of the wing, a member secured to the gate which projects beyond the pivoted wing, and a rod pivoted to the wing and which is adapted to engage the member.

6. A mechanical shovel, a gate pivoted thereto, means to hold the gate open, and means adapted to be operated by material entering the shovel, which means are adapted to close the gate.

7. A mechanical shovel, a gate pivoted thereto, means to hold the gate open, a screen pivoted on the inside of the shovel, and means connected with the screen, which means are adapted to close the gate.

8. A mechanical shovel, a gate pivoted thereto, means to hold the gate open, a member pivoted within the shovel, a link secured to one arm of the member, and means to free which are adapted to secure the draft member.

22. A mechanical shovel, a gate and a draft member pivoted thereto, the draft member being adapted to engage the gate when it is open and to so hold it, a cam mounted to rock on the shovel, a hook bar pivoted to the draft member, the hook on the hook bar being adapted to engage the cam, means within the shovel which are adapted to be operated by the movement of the material, and means connected with the said means which are adapted to rock the cam.

23. A mechanical shovel, a gate and a draft member pivoted thereto, the draft member being adapted to engage the gate when it is open and to so hold it, a cam mounted on the shovel, a hook bar pivoted to the draft member, the hook on the hook bar being adapted to engage the cam, pivoted means within the shovel, and means connected with the said pivoted means which are adapted to rock the cam.

24. A mechanical shovel, a gate and a draft member pivoted thereto, a guide member disposed in front of the shovel, a contact wheel on the inside of the gate which is adapted to engage the draft member, a member pivoted within the shovel, a cam adapted to rock on the shovel, means connected with the pivoted member which are adapted to rock the cam, and a hook bar pivoted to the draft member, the hook on the hook bar being adapted to engage the cam to hold the draft member upwardly disposed.

25. A mechanical shovel, a gate and a draft member pivoted thereto, a guide member disposed in front of the shovel, a contact wheel on the inside of the gate which is adapted to engage the draft member, a member pivoted within the shovel, a cam adapted to rock on the shovel, means connected with the pivoted member which are adapted to rock the cam, a hook bar pivoted to the draft member, the hook on the hook bar being adapted to engage the cam to hold the draft member upwardly disposed, and a guard for the hook bar.

26. A mechanical shovel, a gate and a draft member pivoted thereto, the draft member being adapted to engage the gate when it is open and to so hold it, means within the shovel which are adapted to be operated by the movement of the material entering it, means connected with the said means which are adapted to free the draft member, and means for opening the gate, which means are adapted to be operated by contact with the trip.

27. A mechanical shovel, a gate and a draft member pivoted thereto, the draft member being adapted to engage the gate when it is open and to so hold it, means adapted to free the draft member, means pivoted within the shovel which are adapted to operate the said means, and means which are adapted to open the gate, the last named means being adapted to be operated by contact with a trip.

28. A mechanical shovel, a gate and a draft member pivoted thereto, the draft member being adapted to engage the gate when it is open and to so hold it, a cam which is adapted to rock on the shovel, a hook bar pivoted to the draft member, the hook on the said hook bar being adapted to engage the cam, means within the shovel which are adapted to be operated by the movement of the material entering it, means connected with the said means which are adapted to rock the cam, and means for opening the gate, the last named means being adapted to be operated by contact with a trip.

29. A mechanical shovel, a gate and a draft member pivoted thereto, the draft member being adapted to engage the gate when it is open and to so hold it, a guide member disposed in front of the shovel, means within the shovel which are adapted to be operated by the movement of the material entering it, means to secure the draft member, means connected with the means within the shovel which are adapted to release the draft bar, and means which are adapted to open the gate.

30. A mechanical shovel, a gate and a draft member pivoted thereto, a guide member disposed in front of the shovel, a contact wheel on the inside of the gate which is adapted to engage the draft member, a member pivoted within the shovel, a cam adapted to rock on the shovel, means connected with the pivoted member which are adapted to rock the cam, a hook bar pivoted to the draft member, the hook on the hook bar being adapted to engage the cam to hold the draft member upwardly disposed, and means for opening the gate.

31. A mechanical shovel, two end gates pivoted thereto, both gates being adapted to open in the same direction, a draft member which is also pivoted to the mechanical shovel, the draft member being adapted to engage one of the gates when it is so open and to so hold it, means within the shovel which are adapted to be operated by the movement of the material therein, means which are adapted to secure the draft member, and means connected with the means within the shovel which are adapted to release the means for securing the draft member.

32. A mechanical shovel, two gates pivoted thereto, both gates being adapted to open in the same direction, a draft member which is also pivoted to the mechanical shovel, the draft member being adapted to engage one of the gates when it is open and to so hold it, pivoted means within the shovel which are adapted to be operated by the movement of the material therein, means for securing the draft member, and means connected with the pivoted means which are adapted to free the draft member.

33. A mechanical shovel, two gates pivoted thereto, both gates being adapted to open in the same direction, a draft member which is also pivoted to the shovel, the draft member being adapted to engage the gate when it is open and to so hold it, a cam which is adapted to rock on the shovel, a hook bar which is pivoted to the draft member, the hook on the hook bar being adapted to engage the cam, means within the shovel which are adapted to be operated by the movement of the material therein, and means connected with the said means which are adapted to rock the cam.

34. A mechanical shovel, two gates pivoted thereto, both gates being adapted to open in the same direction, a draft member which is also pivoted to the shovel, the draft member being adapted to engage one of the gates when it is open and to so hold it, a guide member disposed in front of the shovel, means within the shovel which are adapted to be operated by the movement of the material therein, means to secure the draft member, and means connected with the means within the shovel which are adapted to free the draft member.

35. A mechanical shovel, two gates pivoted thereto, both gates being adapted to open in the same direction, a draft member which is also pivoted to the shovel, a cam which is adapted to rock on the shovel, a hook bar pivoted to the draft member, a hook on the hook bar being adapted to engage the cam, a guide member disposed in front of the shovel, means within the shovel which are adapted to be operated by the movement of the material therein, and means connected with the said means which are adapted to rock the cam.

36. A mechanical shovel, two gates pivoted thereto, both gates being adapted to open in the same direction, a draft member which is pivoted to the shovel, the draft member being adapted to engage one of the gates when it is open and to so hold it, means within the shovel which are adapted to be operated by the movement of the material therein, means which are adapted to secure the draft member, means connected with the means within the shovel which are adapted to free the draft member, and means which are adapted to open one of the gates.

37. A mechanical shovel, a gate therefor a wing pivoted to the shovel, means connected to the wing which are adapted to open the gate, a draft member pivoted to the shovel, the draft member being adapted to engage the gate when it is open and to so hold it, means within the shovel which are adapted to be operated by the movement of the material therein, means to secure the draft member, and means connected with the said means within the shovel which are adapted to free the draft member.

38. A mechanical shovel, a gate therefor, a wing pivoted to the shovel which is adapted to be operated by a trip, means connected to the wing which are adapted to open the gate, a draft member pivoted to the shovel, the draft member being adapted to engage the gate when it is open and to so hold it, means within the shovel which are adapted to be operated by the movement of the material therein, means to secure the draft member, and means connected with the means within the shovel which are adapted to free the draft member.

39. A mechanical shovel, a gate therefor, a wing pivoted to the shovel which is adapted to be operated by a trip, means connected to the wing which are adapted to open the gate, a draft member pivoted to the shovel, a guide member disposed in front of the shovel, a contact wheel on the inside of the gate which is adapted to engage the draft member, a member pivoted within the shovel, a cam adapted to rock on the shovel, means connected with the pivoted means which are adapted to rock the cam, and a hook bar pivoted to the draft member, the hook on the hook bar being adapted to engage the cam.

40. In a mechanical scraper, ways, a shovel which is adapted to travel on the ways, a hopper in close proximity to the ways, a trip disposed on the ways, means to haul the shovel to and from the ways, a gate pivoted to the shovel, means on the shovel which are adapted to connect the trip to open the gate, means to hold the gate open, and means which are adapted to be operated by material entering the shovel which are adapted to close the gate.

41. A mechanical scraper, ways, a shovel which is adapted to travel on the ways, a hopper in close proximity to the ways, a trip disposed on the ways, a supporting cable for the shovel which is also adapted to haul the shovel in one direction, means for hauling the shovel in the opposite direction, a gate pivoted to the shovel, means adapted to engage the trip to open the gate, means to hold the gate open, and means which are adapted to be operated by material entering the shovel, which are adapted to close the gate.

42. In a mechanical scraper, a shovel, a supporting cable therefor, a block secured to the shovel through which the supporting cable is disposed, a pulley secured to the shovel, on which the cable may run when that portion of the shovel is disposed upwardly, and a block at a distance, through which the supporting cable is disposed, the outer terminal of the said cable being secured to the shovel.

43. In a mechanical scraper, ways, a shovel which is adapted to travel on the ways, a hopper in close proximity to the ways, a trip disposed on the ways, means to haul the shovel to and from the ways, a gate pivoted to the shovel, means adapted to engage the trip to open the gate, a draft member pivoted to the shovel, the draft member being adapted to engage the gate when it is open and to so hold it, means within the shovel which are adapted to be operated by the movement of the material therein, means to secure the draft member, and means connected with the means within the shovel which are adapted to free the draft member.

44. In a mechanical scraper, ways, a shovel which is adapted to travel on the ways, a hopper in close proximity to the ways, a trip disposed on the ways, means to haul the shovel to and fro on the ways, a gate pivoted to the shovel, means adapted to engage the trip to open the gate, a draft member pivoted to the shovel, a guide member disposed in front of the shovel, a contact wheel on the inside of the gate which is adapted to engage the draft member, a member pivoted within the shovel, a cam adapted to rock on the shovel, means connected with the pivoted member which are adapted to rock the cam, and a hook bar pivoted to the draft member, the hook on the hook bar being adapted to engage the cam.

In testimony whereof I have signed my name to this specification in the presence of two subscribing witnesses.

FOLAND ROMEYN ABEEL.

Witnesses:
SAMUEL F. MCANALLY,
GEO. A. ASHBY.